United States Patent
Park et al.

(10) Patent No.: US 8,432,812 B2
(45) Date of Patent: Apr. 30, 2013

(54) METHOD OF PERFORMING RANDOM ACCESS PROCEDURE IN WIRELESS COMMUNICATION SYSTEM

(75) Inventors: Sung Jun Park, Seoul (KR); Young Dae Lee, Seoul (KR); Seung June Yi, Seoul (KR); Sung Duck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 392 days.

(21) Appl. No.: 12/681,481

(22) PCT Filed: Oct. 29, 2008

(86) PCT No.: PCT/KR2008/006358
§ 371 (c)(1),
(2), (4) Date: Apr. 2, 2010

(87) PCT Pub. No.: WO2009/057932
PCT Pub. Date: May 7, 2009

(65) Prior Publication Data
US 2010/0272035 A1    Oct. 28, 2010

Related U.S. Application Data

(60) Provisional application No. 60/983,563, filed on Oct. 29, 2007, provisional application No. 61/039,095, filed on Mar. 24, 2008.

(30) Foreign Application Priority Data

Sep. 17, 2008  (KR) .................. 10-2008-0091107

(51) Int. Cl.
*H04L 12/26* (2006.01)

(52) U.S. Cl.
USPC .................. 370/236; 370/252; 370/328

(58) Field of Classification Search .............. 370/236, 370/252, 324, 328, 331, 350
See application file for complete search history.

(56) References Cited

U.S. PATENT DOCUMENTS

| | | | |
|---|---|---|---|
| 6,388,997 B1* | 5/2002 | Scott | 370/280 |
| 2005/0135318 A1 | 6/2005 | Walton et al. | |
| 2005/0221833 A1 | 10/2005 | Granzow et al. | |
| 2007/0206531 A1 | 9/2007 | Pajukoski et al. | |
| 2007/0293224 A1* | 12/2007 | Wang et al. | 455/436 |
| 2008/0043771 A1* | 2/2008 | Cho et al. | 370/431 |
| 2008/0205433 A1* | 8/2008 | Pihlaja et al. | 370/461 |
| 2008/0233941 A1* | 9/2008 | Jen | 455/418 |
| 2008/0273610 A1* | 11/2008 | Malladi et al. | 375/260 |
| 2008/0318578 A1* | 12/2008 | Worrall | 455/437 |
| 2009/0041240 A1* | 2/2009 | Parkvall et al. | 380/247 |
| 2009/0046641 A1* | 2/2009 | Wang et al. | 370/329 |
| 2009/0247221 A1* | 10/2009 | Lapstun et al. | 455/556.1 |
| 2010/0093386 A1* | 4/2010 | Damnjanovic et al. | 455/522 |
| 2011/0268234 A1* | 11/2011 | Khandekar et al. | 375/354 |

* cited by examiner

*Primary Examiner* — Kwang B Yao
*Assistant Examiner* — Nguyen Ngo
(74) *Attorney, Agent, or Firm* — Lee, Hong, Degerman, Kang & Waimey (57) ABSTRACT

A method of performing random access procedure includes receiving information on a dedicated random access preamble, transmitting the dedicated random access preamble, and receiving a random access response comprising a random access preamble identifier corresponding to the dedicated random access preamble and a downlink radio resource assignment.

12 Claims, 9 Drawing Sheets

METHOD OF PERFORMING RANDOM ACCESS PROCEDURE IN WIRELESS COMMUNICATION SYSTEM

CROSS-REFERENCE TO RELATED APPLICATIONS

This application is the National Stage filing under 35 U.S.C. §371 of International Application No. PCT/KR2008/006358, filed on Oct. 29, 2008, which claims the benefit of earlier filing date and right of priority to Korean Application No. 10-2008-0091107, filed on Sep. 17, 2008, and also claims the benefit of U.S. Provisional Application Serial Nos. 60/983,563, filed on Oct. 29, 2007, and 61/039,095, filed on Mar. 24, 2008.

TECHNICAL FIELD

The present invention relates to wireless communications, and more particularly, to a method of transmitting or receiving data during a random access procedure in a wireless communication system.

BACKGROUND ART

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future. Reduction of cost per bit, increase of service availability, flexible use of frequency bands, simple structure and open interface, proper power consumption of a user equipment (UE), and the like are defined as requirements.

In general, there are one or more cells within the coverage of a base station (BS). There may be a plurality of UEs in a cell. A UE is generally subjected to a random access procedure to access a network. The random access procedure is performed by the UE for the purposes of initial access, handover, scheduling request, timing alignment, etc.

The random access procedure can be classified into a contention based random access procedure and a non-contention based random access procedure. A major difference between the two random access procedures lies in whether a random access preamble is dedicatedly assigned to one UE. In the non-contention based access procedure, since a UE uses only the random access preamble dedicatedly assigned to the UE, contention (or collision) with another UE does not occur. The contention occurs when two or more UEs attempt the random access procedure by using the same random access preamble through the same resource. In the contention based random access procedure, there is a possibility of contention since random access preambles used by the UEs are randomly selected.

As described above, when it is considered that the random access procedure is initiated for various reasons and is classified into the contention based random access procedure and the non-contention based random access procedure, the random access procedure may be ineffective if a random access response in use has only one configuration.

For example, in the non-contention based random access procedure, the UE can transmit uplink data by using uplink radio resource assignment information included in the random access response. However, if the UE does not have the uplink data, the uplink radio resource assignment information is unnecessary.

Accordingly, there is a need for a method capable of utilizing radio resources further effectively in a random access procedure.

DISCLOSURE OF INVENTION

Technical Problem

The present invention provides a method of performing a non-contention based random access procedure to effectively utilize radio resources in a wireless communication system.

The present invention also provides a method of performing a non-contention based random access procedure to reduce battery consumption of a user equipment in a wireless communication system.

Technical Solution

In an aspect, a method of performing random access procedure in a wireless communication system is provided. The method includes receiving information on a dedicated random access preamble, transmitting the dedicated random access preamble, and receiving a random access response comprising a random access preamble identifier corresponding to the dedicated random access preamble and a downlink radio resource assignment.

The method may further include receiving downlink data using the downlink radio resource assignment. The downlink radio resource assignment may comprise resource assignment to receive the downlink data and information on hybrid automatic repeat request (HARQ) feedback transmission for the downlink data. A HARQ feedback for the downlink data may be transmitted using the information on the HARQ feedback transmission.

The random access response may be a medium access control (MAC) protocol data unit (PDU), the MAC PDU comprising a MAC header and at least one MAC random access response (RAR), the MAC header comprising at least MAC subheader, each MAC subheader corresponding to a MAC RAR, a MAC subheader comprising the random access preamble identifier, the MAC RAR comprising the downlink radio resource assignment.

In another aspect, a method of performing random access procedure in a wireless communication system is provided. The method includes receiving information on a dedicated random access preamble, transmitting the dedicated random access preamble, and receiving a random access response on a physical downlink shared channel (PDSCH) indicated by a physical downlink control channel (PDCCH), the random access response comprising a random access preamble identifier corresponding to the dedicated random access preamble and a downlink radio resource assignment.

Advantageous Effects

Radio resources can be effectively used by the use of various types of random access responses. In addition, since downlink data can be received through a physical downlink shared channel (PDSCH) without monitoring a physical downlink control channel (PDCCH), battery consumption of a user equipment can be decreased and cell capacity can be increased.

MODE FOR THE INVENTION

Figure 1:
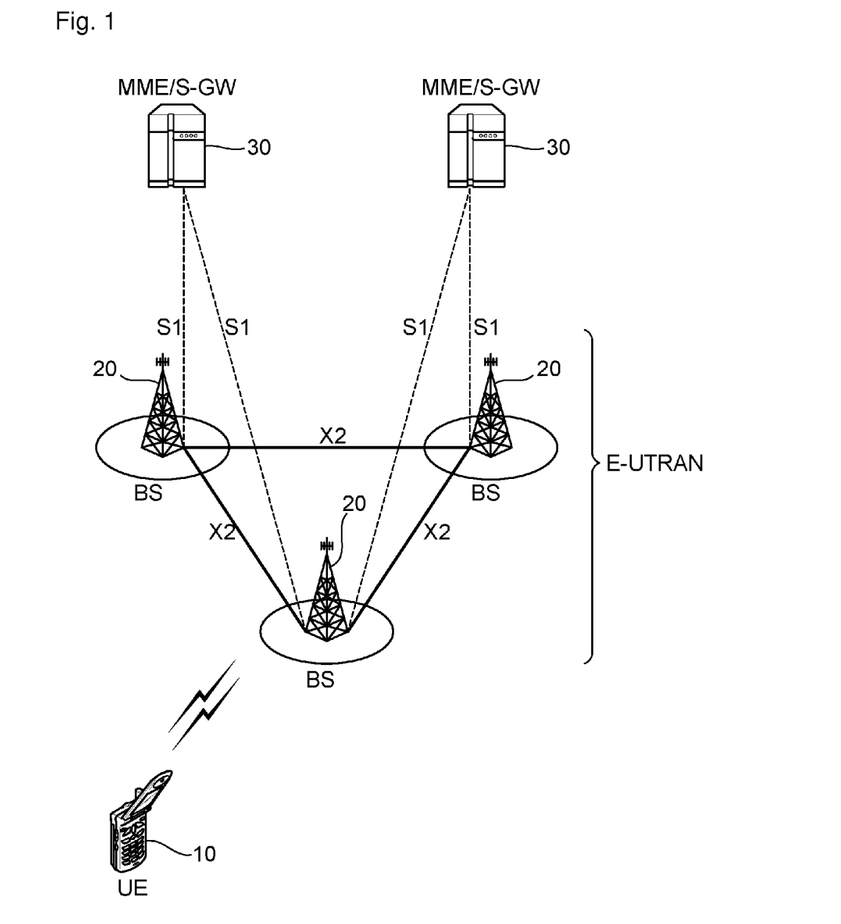
FIG. 1 shows a structure of a wireless communication system.

FIG. 1 shows a structure of a wireless communication system. The wireless communication system may have a network structure of an evolved-universal mobile telecommunications system (E-UMTS). The E-UMTS may be referred to as a long-term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

Figure 2:
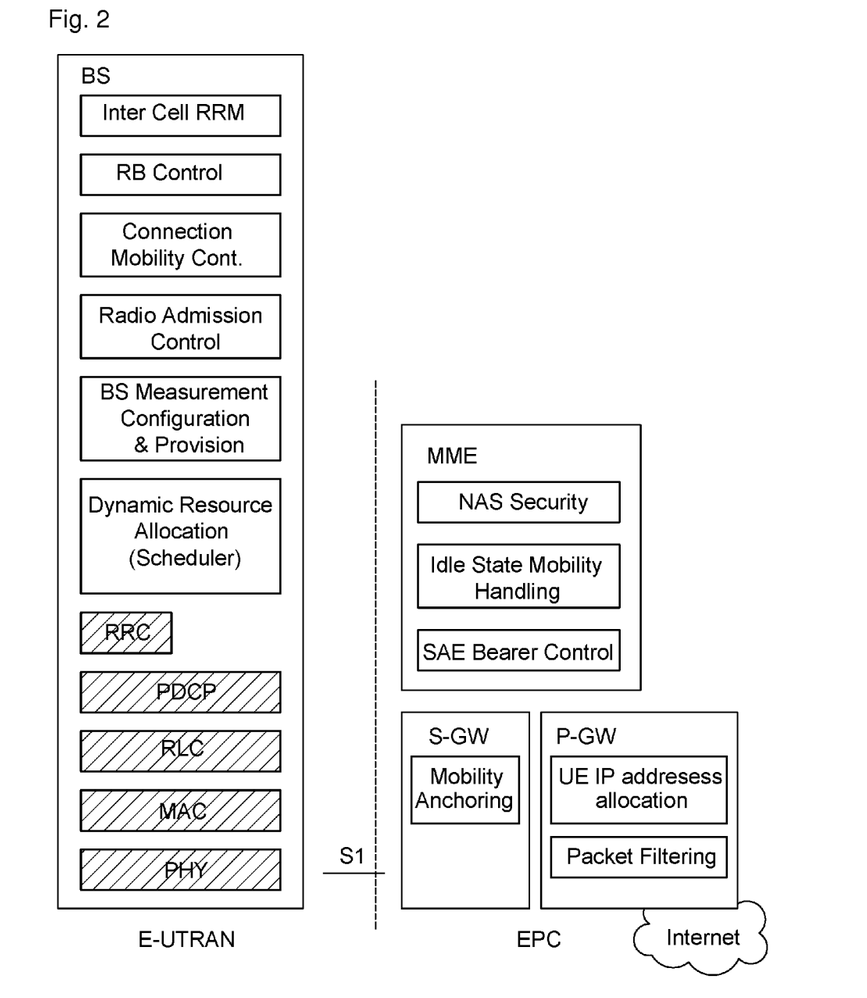
FIG. 2 is a block diagram showing functional split between an evolved universal terrestrial radio access network (E-UTRAN) and an evolved packet core (EPC).

FIG. 2 is a block diagram showing functional split between the E-UTRAN and the EPC. Slashed boxes depict radio protocol layers and white boxes depict the functional entities of the control plane.

Referring to FIG. 2, the BS performs the following functions: (1) functions for radio resource management (RRM) such as radio bearer control, radio admission control, connection mobility control, and dynamic allocation of resources to the UE; (2) Internet protocol (IP) header compression and encryption of user data streams; (3) routing of user plane data to the S-GW; (4) scheduling and transmission of paging messages; (5) scheduling and transmission of broadcast information; and (6) measurement and measurement reporting configuration for mobility and scheduling.

The MME performs the following functions: (1) non-access stratum (NAS) signaling; (2) NAS signaling security; (3) idle mode UE reachability; (4) tracking area list management; (5) roaming; and (6) authentication.

The S-GW performs the following functions: (1) mobility anchoring; and (2) lawful interception. A PDN gateway (P-GW) performs the following functions: (1) UE IP allocation; and (2) packet filtering.

Figure 3:
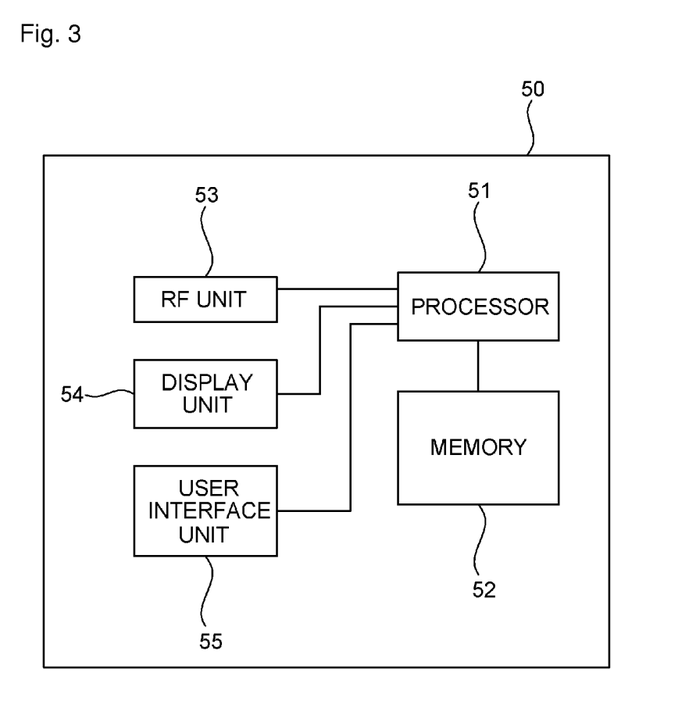
FIG. 3 is a block diagram showing constitutional elements of a user equipment.

FIG. 3 is a block diagram showing constitutional elements of the UE. A UE 50 includes a processor 51, a memory 52, a radio frequency (RF) unit 53, a display unit 54 and a user interface unit 55. Layers of the radio interface protocol are implemented in the processor 51. The processor 51 provides the control plane and the user plane. The function of each layer can be implemented in the processor 51. The memory 52 is coupled to the processor 51 and stores an operating system, applications, and general files. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into L1 layer (a first layer), L2 layer (a second layer), and L3 layer (a third layer) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

Figure 4:
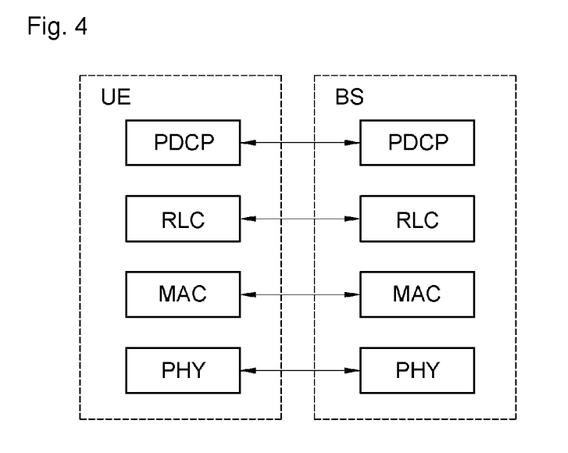
FIG. 4 is a diagram showing a radio protocol architecture for a user plane.
Figure 5:
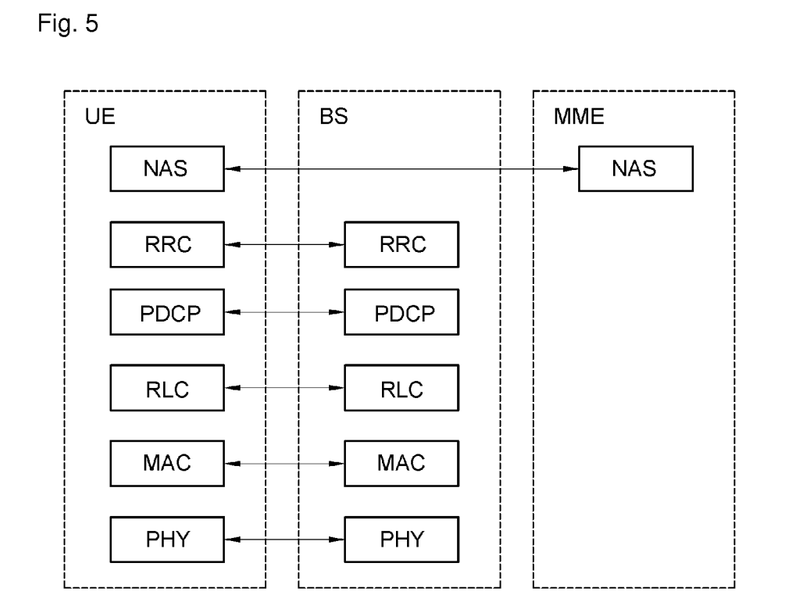
FIG. 5 is a diagram showing a radio protocol architecture for a control plane.

FIG. 4 is a diagram showing a radio protocol architecture for the user plane. FIG. 5 is a diagram showing a radio protocol architecture for the control plane. They illustrate the architecture of a radio interface protocol between the UE and the E-UTRAN. The user plane is a protocol stack for user data transmission. The control plane is a protocol stack for control signal transmission.

Referring to FIGS. 4 and 5, a PHY layer belongs to the first layer and provides an upper layer with an information transfer service through a physical channel. The PHY layer is coupled with a medium access control (MAC) layer, i.e., an upper layer of the PHY layer, through a transport channel. Data is transferred between the MAC layer and the PHY layer through the transport channel. Between different PHY layers (i.e., a PHY layer of a transmitter and a PHY layer of a receiver), data are transferred through the physical channel.

The MAC layer belongs to the second layer and provides services to a radio link control (RLC) layer, i.e., an upper layer of the MAC layer, through a logical channel. The RLC layer in the second layer supports reliable data transfer. There are three operating modes in the RLC layer, that is, a transparent mode (TM), an unacknowledged mode (UM), and an acknowledged mode (AM) according to a data transfer method. An AM RLC provides bidirectional data transmission services and supports retransmission when the transfer of the RLC protocol data unit (PDU) fails.

A packet data convergence protocol (PDCP) layer belongs to the second layer and performs a header compression function for reducing an IP packet header size.

A radio resource control (RRC) layer belongs to the third layer and is defined only in the control plane. The RRC layer serves to control the logical channel, the transport channel, and the physical channel in association with configuration, reconfiguration and release of radio bearers (RBs). An RB is a service provided by the second layer for data transmission between the UE and the E-UTRAN. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

Figure 6:
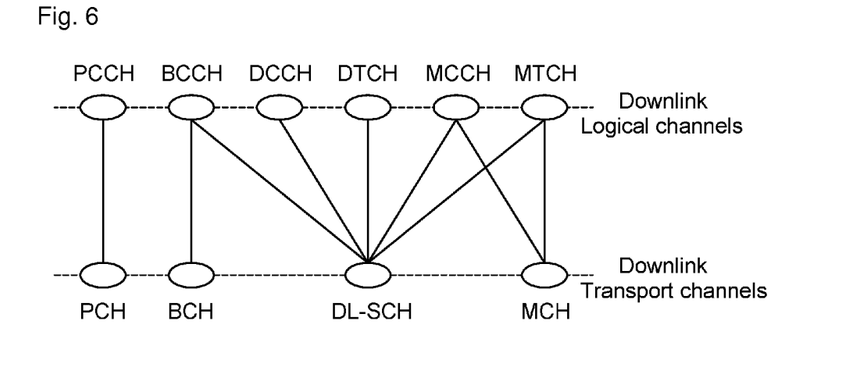
FIG. 6 shows mapping between downlink logical channels and downlink transport channels.
Figure 7:
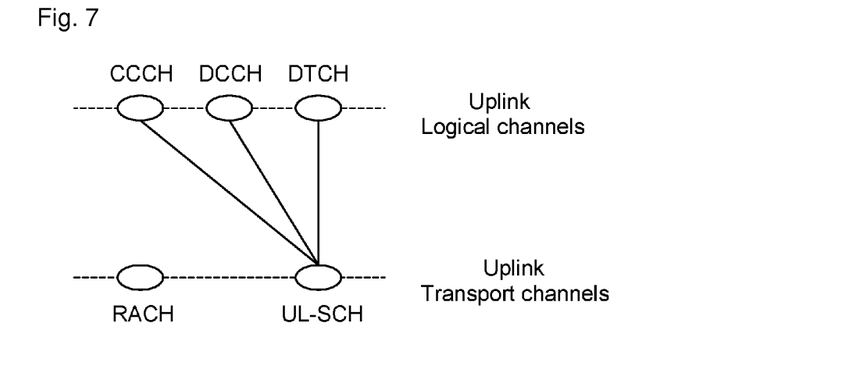
FIG. 7 shows mapping between uplink logical channels and uplink transport channels.

FIG. 6 shows mapping between downlink logical channels and downlink transport channels. FIG. 7 shows mapping between uplink logical channels and uplink transport channels. This may be found in section 6.1.3 of the 3GPP TS 36.300 V8.3.0 (2007-12) Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

Referring to FIGS. 6 and 7, in downlink, a paging control channel (PCCH) is mapped to a paging channel (PCH). A broadcast control channel (BCCH) is mapped to a broadcast channel (BCH) or a downlink shared channel (DL-SCH). A common control channel (CCCH), a dedicated control channel (DCCH), a dedicated traffic channel (DTCH), a multicast control channel (MCCH), and a multicast traffic channel (MTCH) are mapped to the DL-SCH. The MCCH and MTCH are also mapped to a multicast channel (MCH). In uplink, the CCCH, the DCCH, and the DTCH are mapped to an uplink shared channel (UL-SCH).

A type of each logical channel is defined according to a type of information to be transmitted. A logical channel is classified into two groups, i.e., a control channel and a traffic channel.

The control channel is used for transfer of control plane information. The BCCH is a downlink control channel for broadcasting system control information. The PCCH is a downlink channel for transmitting paging information and is used when a network does not know the location of a UE. The CCCH is a channel for transmitting control information between the UE and the network and is used when there is no RRC connection established between the UE and the network. The MCCH is a point-to-multipoint downlink channel used for transmitting multimedia broadcast multicast service (MBMS) control information from the network to the UE. The MCCH is used by UEs that receive an MBMS. The DCCH is a point-to-point bi-directional channel for transmitting dedicated control information between the UE and the network, and is used by UEs having an RRC connection.

The traffic channel is used for the transfer of user plane information. The DTCH is a point-to-point channel dedicated to one UE and is used for the transfer of user information. The DTCH can exist in both uplink and downlink. The MTCH is a point-to-multipoint downlink channel for transmitting traffic data from the network to the UE and is used by the UEs that receive the MBMS.

The transport channel is classified according to a type and characteristic of data transmission through a radio interface. The BCH is broadcast in the entire coverage area of the cell and has a fixed, pre-defined transport format. The DL-SCH is characterized by support for hybrid automatic repeat request (HARQ), support for dynamic link adaptation by varying modulation, coding, and transmit (Tx) power, possibility to be broadcast in the entire cell, and possibility to use beamforming, support for both dynamic and semi-static resource assignment, support for UE discontinuous reception (DRX) to enable UE power saving, and support for MBMS transmission. The PCH is characterized by support for DRX to enable UE power saving and requirement to be broadcast in the entire coverage area of the cell. The MCH is characterized by support for requirement to be broadcast in the entire coverage area of the cell and support for an MBMS single frequency network (MBSFN).

The UL-SCH and a random access channel (RACH) are uplink transport channels. The UL-SCH is characterized by support for dynamic link adaptation for changing the modulation, coding, and Tx power and support for HARQ and dynamic/semi-static resource assignment. The RACH is characterized by limited control information and collision risk.

Figure 8:
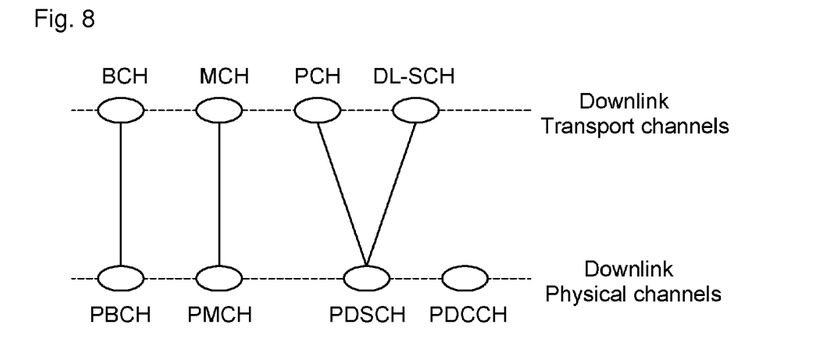
FIG. 8 shows mapping between downlink transport channels and downlink physical channels.
Figure 9:
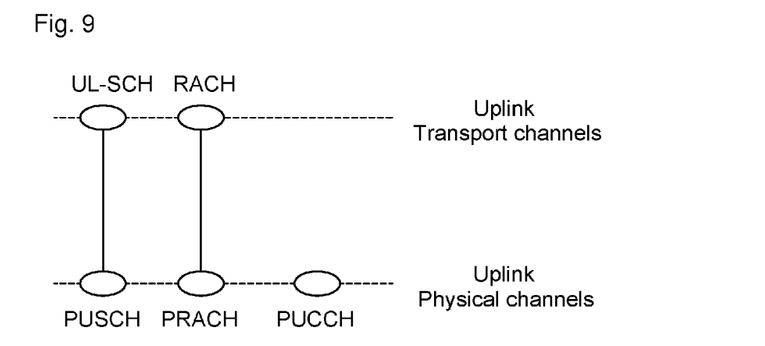
FIG. 9 shows mapping between uplink transport channels and uplink physical channels.

FIG. 8 shows mapping between downlink transport channels and downlink physical channels. FIG. 9 shows mapping between uplink transport channels and uplink physical channels.

Referring to FIGS. 8 and 9, in downlink, a BCH is mapped to a physical broadcast channel (PBCH). An MCH is mapped to a physical multicast channel (PMCH). A PCH and a DL-SCH are mapped to a physical downlink shared channel (PDSCH). The PBCH carries a BCH transport block. The PMCH carries the MCH. The PDSCH carries the DL-SCH and the PCH. In uplink, a UL-SCH is mapped to a physical uplink shared channel (PUSCH). An RACH is mapped to a physical random access channel (PRACH). The PRACH carries a random access preamble.

There are several physical control channels used in a PHY layer. A physical downlink control channel (PDCCH) informs a UE of resource assignment of the PCH and DL-SCH, and also informs the UE of HARQ information related to the DL-SCH. The PDCCH may carry an uplink scheduling grant which informs the UE of resource assignment for uplink transmission. A physical control format indicator channel (PCFICH) informs the UE of the number of orthogonal frequency division multiplexing (OFDM) symbols used for the PDCCHs and is transmitted in every subframe. A physical hybrid ARQ indicator channel (PHICH) carries HARQ acknowledgement (ACK)/negative-acknowledgement (NACK) signals in response to uplink transmission. A physical uplink control channel (PUCCH) carries HARQ ACK/NACK signals in response to downlink transmission, a scheduling request, and uplink control information (e.g., a channel quality indicator (CQI)).

Figure 10:
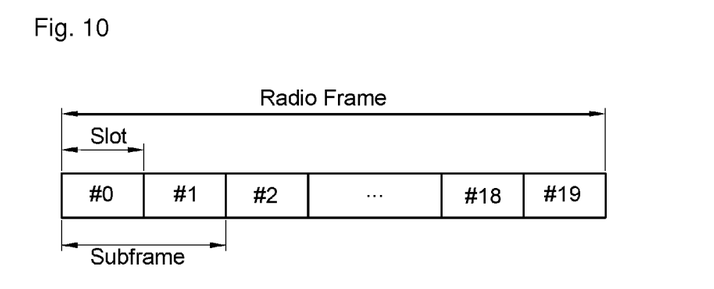
FIG. 10 shows a structure of a radio frame.

FIG. 10 shows a structure of a radio frame.

Referring to FIG. 10, the radio frame includes 10 subframes. One subframe includes two slots. A time for transmitting one subframe is defined as a transmission time interval (TTI). For example, one subframe may have a length of 1 ms, and one slot may have a length of 0.5 ms.

The radio frame of FIG. 10 is shown for exemplary purposes only. Thus, the number of subframes included in the radio frame or the number of slots included in the subframe or the number of OFDM symbols included in the slot may change variously.

Figure 11:
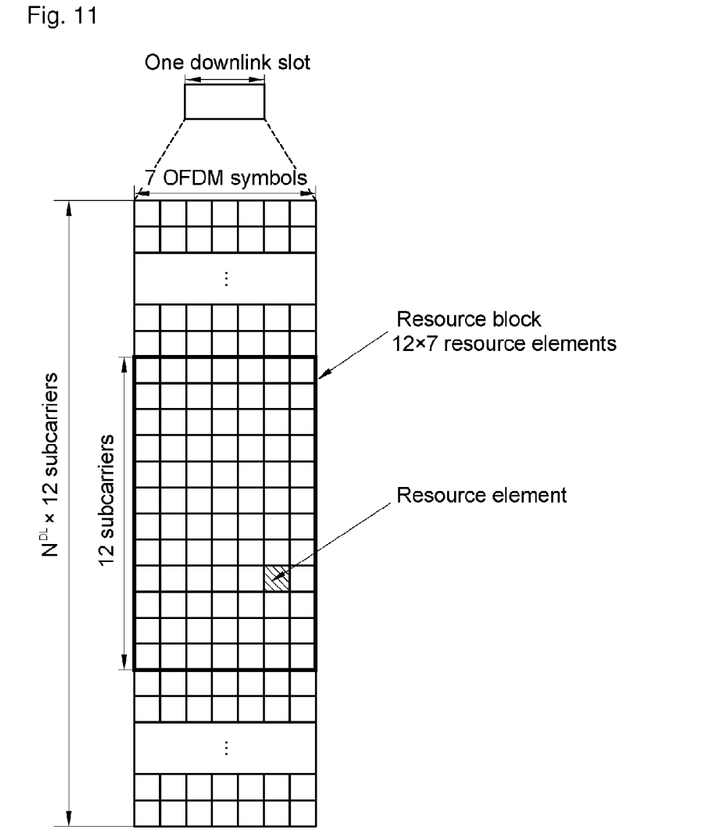
FIG. 11 shows an example of a resource grid for one downlink slot.

FIG. 11 shows an example of a resource grid for one downlink slot.

Referring to FIG. 11, the downlink slot includes a plurality of OFDM symbols in a time domain. Although it is described herein that one downlink slot includes 7 OFDM symbols and one resource block includes 12 subcarriers in a frequency domain, this is for exemplary purposes only, and thus the present invention is not limited thereto.

Elements on the resource grid are referred to as resource elements. One resource block includes 12×7 resource elements. The number $N^{DL}$ of resource blocks included in the downlink slot depends on a downlink transmission bandwidth determined in a cell.

Figure 12:
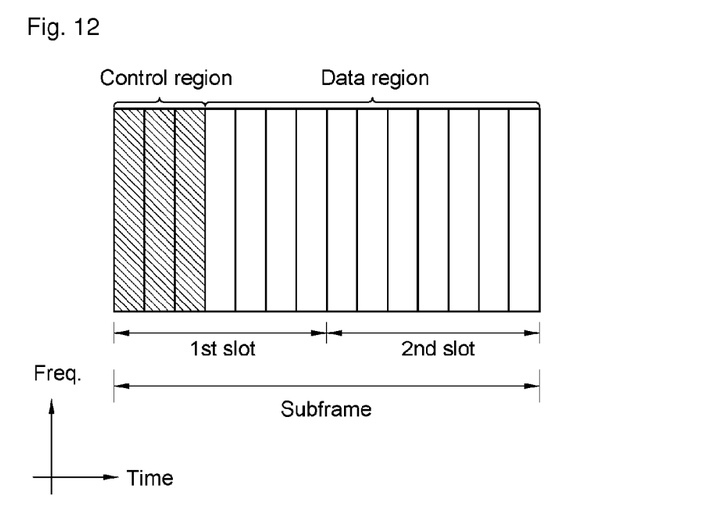
FIG. 12 shows a structure of a subframe.

FIG. 12 shows a structure of a subframe.

Referring to FIG. 12, the subframe includes two consecutive slots. A maximum of three OFDM symbols located in a front portion of a 1st slot within the subframe correspond to a control region to be assigned with a PDCCH. The remaining OFDM symbols correspond to a data region to be assigned with a PDSCH. A PCFICH carries information regarding the number of OFDM symbols used to transmit PDCCHs within the subframe.

Figure 13:
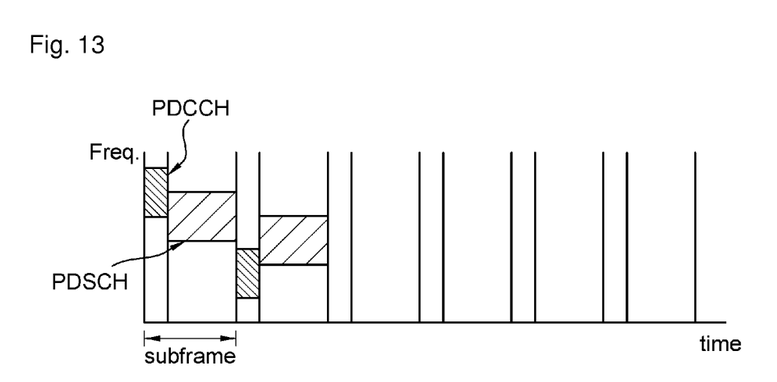
FIG. 13 shows an example of transmitting and receiving data.

FIG. 13 shows an example of transmitting and receiving data.

Referring to FIG. 13, a BS transmits user data on a PDSCH (i.e., physical channel) mapped to a DL-SCH (i.e., transport channel). A PDCCH carries downlink radio resource assignment information which indicates data on the PDSCH. The PDCCH carries information on receiving and decoding the PDSCH by the UEs.

The BS determines a PDCCH format according to control information to be transmitted to the UE, and appends a cyclic redundancy check (CRC) to the control information. A unique identifier (i.e., a radio network temporary identifier (RNTI)) is masked on the CRC according to a usage or an owner of the PDCCH. If the PDCCH is for a specific UE, a UE-specific unique identifier (e.g., cell-RNTI (C-RNTI)) of the UE can be masked on the CRC. If the PDCCH is for paging information, a paging indication identifier (e.g., paging indication-RNTI (PI-RNTI)) can be masked on the CRC. If the PDCCH is for system information, a system information identifier (e.g., system information-RNTI (SI-RNTI)) can be masked on the CRC. To indicate a random access response that is a response for transmission of the random access preamble of the UE, the random access-RNTI (RA-RNTI) can be masked on the CRC.

For example, it is assumed that the PDCCH has a CRC masked with a C-RNTI 'A' and is transmitted at a specific subframe by including information on data which is transmitted using a radio resource 'B' (e.g., a frequency position) according to transfer format information 'C' (e.g., a transfer block size, a modulation and coding scheme, etc.). UEs in a cell monitor the PDCCH by using their C-RNTIs. Upon receiving the PDCCH addressed by the C-RNTI 'A' of the UE at the subframe, the UE receives the PDSCH by using the transport format information 'C' and the radio resource 'B' included in the PDCCH.

Hereinafter, a random access procedure will be described.

First, a UE can perform the random access procedure on a BS in the following cases.

(1) When the UE performs initial access since there is no RRC connection with the BS.

(2) When the UE first accesses to a target cell in a handover procedure.

(3) When it is requested at the command of the BS.

(4) When uplink data is generated in a condition where uplink time alignment is not adjusted or where uplink radio resource is not assigned.

(5) When a recovery procedure is performed due to radio link failure or handover failure.

The random access procedure can be classified into a contention based random access procedure and a non-contention based random access procedure. A major difference between the two random access procedures lies in whether a random access preamble is dedicatedly assigned to one UE. In the non-contention based access procedure, since the UE uses only the random access preamble dedicatedly assigned to the UE, contention (or collision) with another UE does not occur. The contention occurs when two or more UEs attempt the random access procedure by using the same random access preamble through the same resource. In the contention based random access procedure, there is a possibility of contention since random access preambles used by the UEs are randomly selected. In addition, the non-contention based random access procedure can be used only when it is requested at the command of the BS or requested in the handover procedure among the aforementioned cases of performing the random access procedure.

Figure 14:
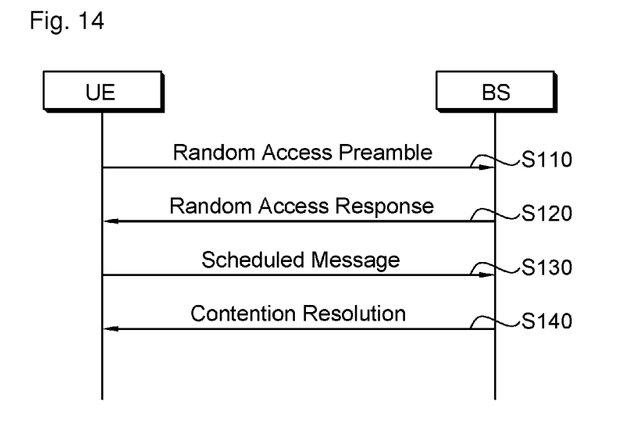
FIG. 14 is a flow diagram showing a contention based random access procedure.

FIG. 14 is a flow diagram showing a contention based random access procedure.

Referring to FIG. 14, in step S110, a UE randomly selects one random access preamble from a set of random access preambles, and transmits the selected random access preamble to a BS by using a PRACH resource. Information on the set of random access preambles can be obtained from the BS by using a part of system information or a handover command message.

In step S120, the UE attempts to receive its random access response within a random access response reception window. The random access response reception window can be specified by the part of system information or the handover command message. The random access response reception window denotes a window for monitoring the random access response. More specifically, the random access response is transmitted in a format of a MAC PDU. The MAC PDU is delivered through a PDSCH that is a physical channel. Reception information of the PDSCH is obtained through a PDCCH that is a control channel. The PDCCH carries information of the UE for receiving the PDSCH, radio resource assignment information of the PDSCH, a transport format of the PDSCH, etc. The UE monitors the PDCCH within a subframe included in the random access response reception window, and upon successfully receiving the PDCCH, receives the random access response on the PDSCH specified by the PDCCH.

The random access response includes a time alignment (TA) value for uplink alignment of the UE, uplink radio resource assignment information, and a temporary UE identifier for identifying UEs performing the random access. The temporary UE identifier may be a random access preamble identifier (RAPID) or a temporary cell-radio network temporary identity (C-RNTI). The RAPID is used to identify a received random access preamble.

In step S130, after applying the TA value, the UE transmits to the BS a scheduled message including the random access identifier by using the uplink radio resource assignment information. According to the TA value, the UE starts or restarts a time alignment timer. The time alignment timer is restarted if it has been running from a previous stage. Otherwise, the time alignment timer is started.

The random access identifier is used to identify the UE for which the BS performs the random access procedure. The random access identifier can be obtained in two ways. First, when the UE already has an effective cell identifier (e.g., C-RNTI) assigned in a corresponding cell before the random access procedure, the cell identifier is used as the random access identifier. Second, when the effective cell identifier is not assigned to the UE before the random access procedure, the UE uses its unique identifier (i.e., SAE temporary mobile station identifier (S-TMSI) or an upper layer identifier) as the random access identifier. The UE starts a contention resolution timer upon transmitting the scheduled message.

In step S140, after receiving the scheduled message, the BS transmits to the UE a contention resolution message including the random access identifier.

In the contention based random access procedure, contention occurs because the number of available random access preambles is limited. Unique random access preambles cannot be assigned to all UEs in the cell. Thus, the UE randomly selects one random access preamble from the set of random access preambles and then transmits the selected random access preamble. As a result, two or more UEs may select and transmit the same random access preamble by using the same PRACH resource. This is a case where the contention occurs. Upon receiving the random access preamble, the BS transmits a random access response for the random access preamble in a state that the BS cannot know whether the contention occurs. However, since the contention occurs, two or more UEs receive the same random access response, and the UEs respectively transmit scheduled messages on the basis of information included in the random access response. This means that the two or more UEs transmit different scheduled messages by using the uplink radio resource assignment information included in the random access response. In this case, both of the two scheduled messages may not be successfully transmitted, or only either one of the two scheduled messages may be successfully received for a specific UE according to Tx power. If the BS successfully receives the scheduled message, the BS transmits the contention resolution message by using the random access identifier included in the scheduled message. Upon receiving the random access identifier of the UE, the UE can know that the contention resolution is successful. The contention resolution is defined as an operation whereby the UE can know a success or failure of contention in the contention based random access procedure.

The contention resolution timer is used for the contention resolution. The contention resolution timer is started after receiving the random access response. The contention resolution timer may be started when the UE transmits the scheduled message. When the contention resolution timer expires, the contention resolution is determined to be a failure, and thus a new random access procedure starts. Upon receiving the contention resolution message including the random access identifier of the UE, the contention resolution timer stops, and the contention resolution is determined to be a success. If the UE has the unique cell identifier (e.g., C-RNTI) before the random access procedure, the UE transmits the scheduled message including the cell identifier of the UE and thereafter starts the contention resolution timer. If the UE receives a PDCCH addressed by the cell identifier of the UE before the contention resolution timer expires, the UE determines that the UE has succeeded in the contention, and then properly finishes the random access procedure. Alternatively, if the UE does not have the C-RNTI, the upper layer identifier may be used as the random access identifier. The UE transmits the scheduling message including the upper layer identifier and thereafter starts the contention resolution timer. If the UE receives on a DL-SCH the contention resolution message including the upper layer identifier of the UE before the contention resolution timer expires, the UE determines that the random access procedure is successful. The contention resolution message is received using the PDCCH addressed by the temporary C-RNTI. However, if the UE cannot receive on the DL-SCH the contention resolution message including the random access identifier of the UE until the contention resolution timer expires, the UE determines that the UE has failed in the contention.

Figure 15:
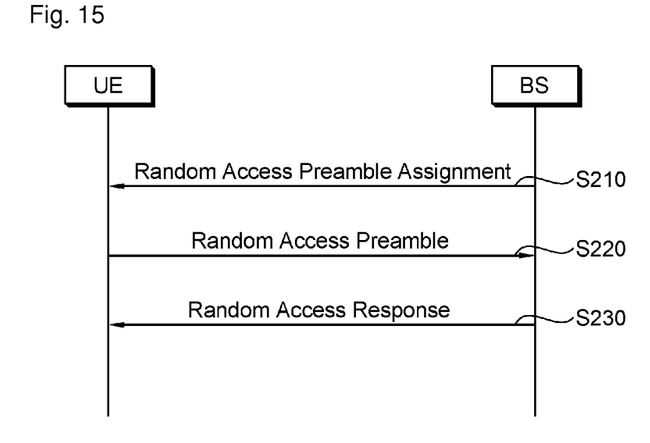
FIG. 15 is a flow diagram showing a non-contention based random access procedure.

FIG. 15 is a flow diagram showing a non-contention based random access procedure.

Referring to FIG. 15, in step S210, a BS assigns a dedicated random access preamble to a UE. For the non-contention based random access procedure, the BS needs to assign the dedicated random access preamble to the UE without a possibility of collision. The dedicated random access preamble may be included in a handover command message or may be transmitted on a PDCCH. If the random access procedure is performed during a handover procedure, the UE can obtain the dedicated random access preamble from the handover command message. If the random access procedure is performed at the request of the BS, the UE can obtain the dedicated random access preamble through the PDCCH.

In step S220, the UE transmits the dedicated random access preamble to the BS by using a PRACH resource.

In step S230, the UE receives a random access response corresponding to the dedicated random access preamble. In comparison with the aforementioned contention based random access procedure, the non-contention based random access procedure is carried out in such a manner that the random access response is received, whether the random access procedure is properly performed is determined, and the random access procedure is finished.

Hereinafter, uplink time alignment will be described. In a wireless communication system, time alignment between a UE and a BS is important so as to minimize interference between users.

A random access procedure is one of methods for uplink time alignment. The BS measures a time alignment (TA) value by using a random access preamble transmitted by the UE, and provides the TA value to the UE by using a random access response. Upon receiving the random access response, the UE starts a time alignment timer after applying the TA value. The time alignment between the BS and the UE is maintained while the time alignment timer is running. When the time alignment timer expires or does not run, it is regarded that the time alignment between the UE and the BS is not maintained. If contention occurs in the contention based random access procedure and the UE fails in the contention, the UE can stop the time alignment timer. If the time alignment timer expires or does not run, the UE cannot perform any uplink transmission except for the random access preamble.

Figure 16:
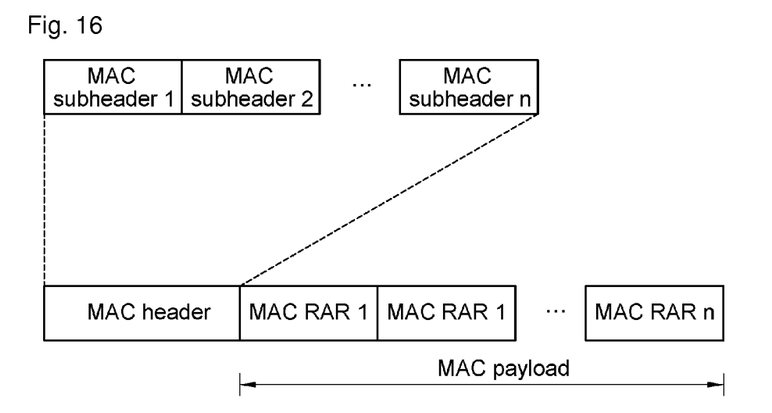
FIG. 16 shows a structure of a medium access control (MAC) protocol data unit (PDU) for a random access response.

FIG. 16 shows a structure of a MAC PDU for a random access response. The MAC PDU includes a MAC header and a MAC payload. The MAC payload includes at least one MAC random access response (RAR). The MAC header includes at least one MAC subheader. The MAC subheader is divided into an RAPID MAC subheader and a backoff indicator (BI) MAC subheader. Each RAPID MAC subheader corresponds to one MAC RAR.

Figure 17:
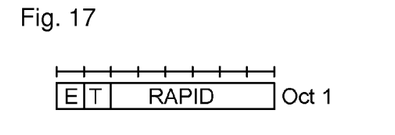
FIG. 17 shows a random access preamble identifier (RAPID) MAC subheader.

FIG. 17 shows the RAPID MAC subheader. An extension (E) field is a flag for indicating whether other fields exist in the MAC header. A type (T) field is a flag for indicating whether the MAC subheader includes an RAPID or a BI. An RAPID field is used to identify a transmitted random access preamble.

Figure 18:
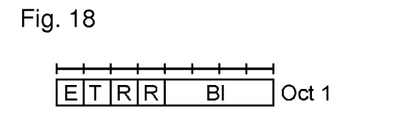
FIG. 18 shows a backoff indicator (BI) MAC subheader.

FIG. 18 shows the BI MAC subheader. An extension (E) field is a flag for indicating whether other fields exist in the MAC header. A type (T) field is a flag for indicating whether the MAC subheader includes an RAPID or a BI. A reserved (R) field indicates a reserved bit. A BI field is used to identify a time at which a next random access is performed according to an overload state.

Figure 19:
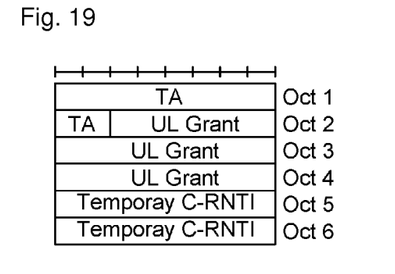
FIG. 19 shows a MAC random access response (RAR).

FIG. 19 shows the MAC RAR. The MAC RAR includes information regarding each random access preamble response. A time alignment (TA) field indicates control required for uplink transmission timing used for timing alignment. A UL grant field indicates resources used in uplink transmission. A temporary C-RNTI indicates a temporary indicator used by a UE during random access.

According to the random access response configured as described above, the temporary C-RNTI and the uplink radio resource assignment are always included in the random access response. However, if it is considered that random access procedure starts for various reasons and is classified into the contention based random access procedure and the non-contention based random access procedure, the configuration of the random access response may be ineffective.

For example, in the non-contention based random access procedure, except for a case where a request is made at the command of the BS, the UE transmits uplink data by using the uplink radio resource assignment information included in the random access response. In general, in order for the UE to transmit the uplink data to the BS, the uplink radio resource has to be assigned through the PDCCH. However, exceptionally, additional PDCCH reception is unnecessary for the transfer of a scheduled message since the uplink radio resource assignment is included in the random access response transmitted through the PDSCH in the random access procedure.

However, if the non-contention based random access procedure is requested at the command of the BS, the uplink radio resource assignment included in the random access response may be unnecessary. The BS requests the non-contention based random access procedure to the UE in the following cases. There may be a case where an uplink time alignment is not achieved between the UE and the BS. In this case, it is assumed that there is downlink data to be transmitted from the BS to the UE. If the downlink data is transmitted using the HARQ, the UE has to transmit to the BS an HARQ feedback (i.e., an HARQ ACK/NACK signal) to report a result of receiving the downlink data. However, if the uplink time alignment is not achieved between the UE and the BS, uplink transmission is prohibited to avoid interference with other UEs. Thus, a problem arises in that the UE cannot transmit the HARQ feedback even if the downlink data is received. That is, in such a situation, the BS requests first to the UE to perform the random access procedure. In addition, the BS may instruct to perform the non-contention based random access procedure by assigning a dedicated random access preamble to the UE.

If the non-contention based random access procedure is performed at the request of the BS, uplink data to be transmitted using the uplink radio resource assignment included in the random access response may not exist in the UE. In this case, the uplink radio resource assignment is unnecessary. In addition, to transmit downlink data on the DL-SCH, the BS has to report the downlink radio resource assignment to the UE through the additional PDCCH. In this case, the configuration of the random access response of FIG. 19 results in waste of radio resources due to transmission of unnecessary uplink radio resource assignment. Further, there is a problem in that transmission of the additional PDCCH is required in addition to the random access response in order to transmit the downlink data.

Figure 20:
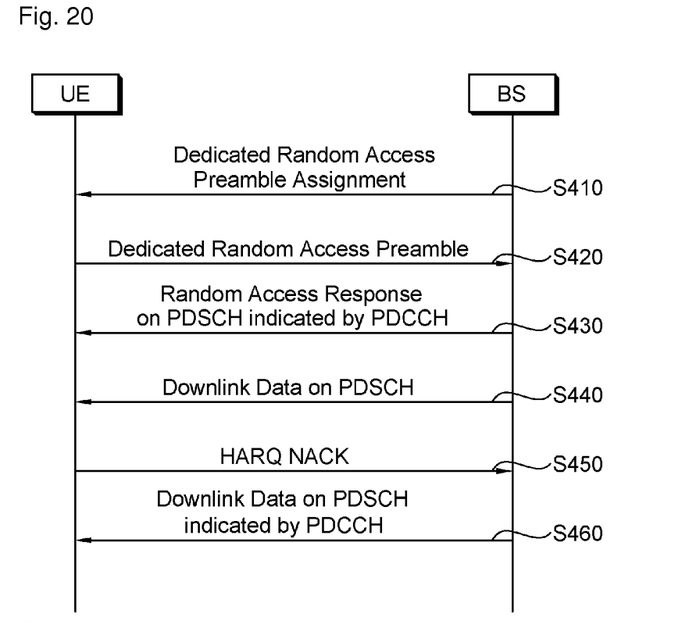
FIG. 20 shows a data transmission method according to an embodiment of the present invention.

FIG. 20 shows a data transmission method according to an embodiment of the present invention.

Referring to FIG. 20, in step S410, a BS assigns a dedicated random access preamble to a UE. The BS transmits the dedicated random access preamble on a PDCCH in order to request the UE to perform a random access procedure. That is, to transmit downlink data to the UE in which an uplink time alignment is not maintained, the BS requests first the UE to perform the random access procedure. The request is transmitted on the PDCCH having a CRC masked with a cell identifier (i.e., C-RNTI) of the UE. The PDCCH can carry information regarding the dedicated random access preamble. Accordingly, the UE can perform a non-contention based random access procedure.

In step S420, the UE transmits the dedicated random access preamble to the BS.

In step S430, the BS transmits a random access response in response to the dedicated random access preamble. The random access response is transmitted to the UE through a PDSCH addressed by the PDCCH having a CRC masked with the RA-RNTI. The random access response includes downlink radio resource assignment.

In step S440, according to the downlink radio resource assignment included in the random access response, the UE receives the downlink data on the PDSCH without receiving of an additional PDCCH.

In step S450, if decoding of the downlink data fails, the UE transmits an HARQ NACK signal for the downlink data to the BS. Information on transmission of an HARQ feedback (i.e., an HARQ ACK/NACK signal) may be included in a part of system information, a handover command message, or the random access response when reported by the BS to the UE.

In step S460, according to the HARQ NACK signal, the UE receives the downlink data transmitted on the PDSCH addressed by the PDCCH having a CRC masked with the C-RNTI of the UE.

In the random access procedure, the downlink radio resource assignment is included in the random access response. Since the UE can directly receive the downlink data on the PDSCH by using the downlink radio resource assignment, monitoring of the PDCCH is unnecessary, thereby reducing battery consumption of the UE. In particular, in the non-contention based random access procedure performed at the command of the BS, if there is no uplink data to be transmitted by the UE, unnecessary uplink radio resource assignment can be prevented from being transmitted using the random access response.

Figure 21:
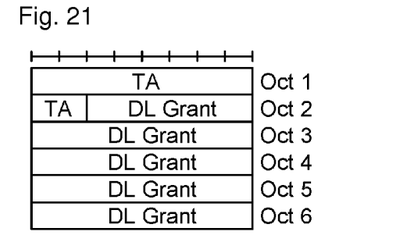
FIG. 21 shows a structure of a MAC RAR according to an embodiment of the present invention.

FIG. 21 shows a structure of a MAC RAR according to an embodiment of the present invention.

Referring to FIG. 21, the MAC RAR includes a TA field and a DL grant field. The TA field includes a UL time alignment value. The DL grant filed indicates downlink radio resource assignment. The DL grant may include various assignment information such as a modulation and coding scheme, a transmit power control message, a CQI request, resource assignment, HARQ feedback transmission information, etc.

There are one or more MAC RAR structures for a random access response. A UE can estimate a structure of a MAC RAR to be received by the UE according to a type of a random access preamble used by the UE and a generation condition of a random access procedure. For example, if the random access procedure is requested at the command of a BS and the random access procedure is a non-contention based random access procedure, the UE estimates that the random access response to be transmitted to the UE has the MAC RAR structure of FIG. 21. In other random access procedures, the UE estimates that the random access response to be transmitted has the MAC RAR structure of FIG. 19.

Upon receiving the random access response including the DL grant field, the UE directly receives downlink data on a PDSCH without receiving of an additional PDCCH according to downlink radio resource assignment information included in the DL grant field. Thus, the UE does not have to attempt to perform monitoring of the PDCCH after the random access response is received until the downlink data is received on the PDSCH. Accordingly, discontinuous reception (DRX) can be performed and battery consumption can be reduced.

If the downlink data is transmitted using HARQ, the UE has to transmit an HARQ feedback to the BS. In general, if the downlink data is received using HARQ, the UE transmits the HARQ feedback as follows. Receiving of the downlink data includes receiving of a PDCCH and receiving of a PDSCH as described above. In addition, according to a decoding result of data transmitted on the PDSCH, an HARQ positive feedback (referred to as an HARQ ACK signal) or an HARQ negative feedback (referred to as an HARQ NACK signal) are transmitted. In addition, information for transmitting the HARQ feedback is in association with the PDCCH related to the PDSCH for the downlink data. That is, according to time/frequency information of the PDCCH, the UE estimates frequency/time information for HARQ feedback transmission related to the PDCCH.

If the downlink data is received using the downlink radio resource assignment included in the random access response, the HARQ feedback may be difficult to be transmitted using HARQ. This is because HARQ feedback transmission information cannot be known since the PDCCH does not exist. For this reason, the proposed random access response may include the HARQ feedback transmission information. The HARQ feedback transmission information may be included in the random access response as a part of the DL grant field. Alternatively, the HARQ feedback transmission information may be reported by the BS to the UE by using a part of system information and a handover command message or by using additional signaling. In addition, the HARQ feedback transmission information may be indexed and then reported to the UE. For example, if index information is composed of 3 bits, frequency and time information may be reported in advance to the UE, wherein the frequency and time information is mapped to indices in the range of 0 to 7.

After receiving the random access response including the downlink radio resource assignment, the UE receives the downlink data on the PDSCH according to the downlink radio resource assignment. If decoding of the downlink data fails, the UE transmits an HARQ NACK signal to the BS according to the HARQ feedback transmission information included in the random access response. Thereafter, the UE attempts to perform monitoring of the PDCCH by using a cell identifier of the UE in order to receive the retransmitted downlink data.

Alternatively, after receiving the random access response included in the downlink radio resource assignment, the UE may not transmit the HARQ feedback irrespective of the decoding result even if the downlink data is received on the PDSCH according to the downlink radio resource assignment.

The UE can switch to a DRX state after receiving the random access response including the downlink radio resource assignment. The UE may remain in the DRX state until a corresponding PDSCH is received according to the downlink radio resource assignment, and may switch to a continuous reception state in a subframe at which the PDSCH is transmitted. In addition, if the downlink data is not correctly received in that subframe, the UE may transmit the HARQ feedback to the BS and then switch back to the DRX state. When the UE switches to the DRX state, the UE can start a round trip time (RTT) timer. The UE can switch back to the continuous reception state when the RTT timer expires. Preferably, a value of the RTT timer can be reported by the BS to the UE by using an RRC message, e.g., a part of system information, a radio bearer configuration, a handover command, etc.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of performing a random access procedure in a wireless communication system, the method performed by a user equipment comprising:
    receiving information regarding a dedicated random access preamble via a physical downlink control channel (PDCCH);
    transmitting the dedicated random access preamble;
    receiving a random access response via a physical downlink shared channel (PDSCH),
    wherein the random access response includes a random access preamble identifier corresponding to the dedicated random access preamble and a downlink radio resource assignment, and
    wherein the PDSCH is addressed by the PDCCH having a cyclic redundancy check (CRC) masked with a unique identifier; and
    receiving downlink data using the downlink radio resource assignment via the PDSCH without monitoring an additional PDCCH.

2. The method of claim 1, wherein the downlink radio resource assignment comprises a resource assignment configured to receive the downlink data and information regarding hybrid automatic repeat request (HARQ) feedback transmission for the downlink data.

3. The method of claim 2, further comprising transmitting a HARQ feedback for the downlink data using the information regarding the HARQ feedback transmission.

4. The method of claim 1, further comprising transmitting hybrid automatic repeat request (HARQ) feedback for the downlink data using information received from system information.

5. The method of claim 1, further comprising transmitting hybrid automatic repeat request (HARQ) feedback for the downlink data using information received from a handover command message.

6. The method of claim 1, wherein a time alignment timer that is configured to enable uplink transmission expires prior to receiving the information regarding the dedicated random access preamble.

7. The method of claim 1, wherein the random access response further includes a time alignment value configured to adjust uplink time alignment.

8. The method of claim 1, wherein:
the random access response is a medium access control (MAC) protocol data unit (PDU) that comprises a MAC header and at least one MAC random access response (RAR),
the MAC header comprises at least one MAC subheader,
the at least one MAC subheader corresponds to a MAC RAR and comprises the random access preamble identifier, and
the MAC RAR comprises the downlink radio resource assignment.

9. The method of claim 8, wherein the MAC RAR further comprises a time alignment field and a downlink grant field configured to indicate the downlink radio resource assignment.

10. The method of claim 9, further comprising:
performing discontinuous reception (DRX) after receiving the random access response; and
discontinuing performance of the DRX when the downlink data is received.

11. The method of claim 9, wherein the time alignment field includes an uplink alignment value.

12. The method of claim 1, wherein the PDCCH is further addressed by a random access-radio network temporary identifier(RA-RNTI).

* * * * *